2,819,404

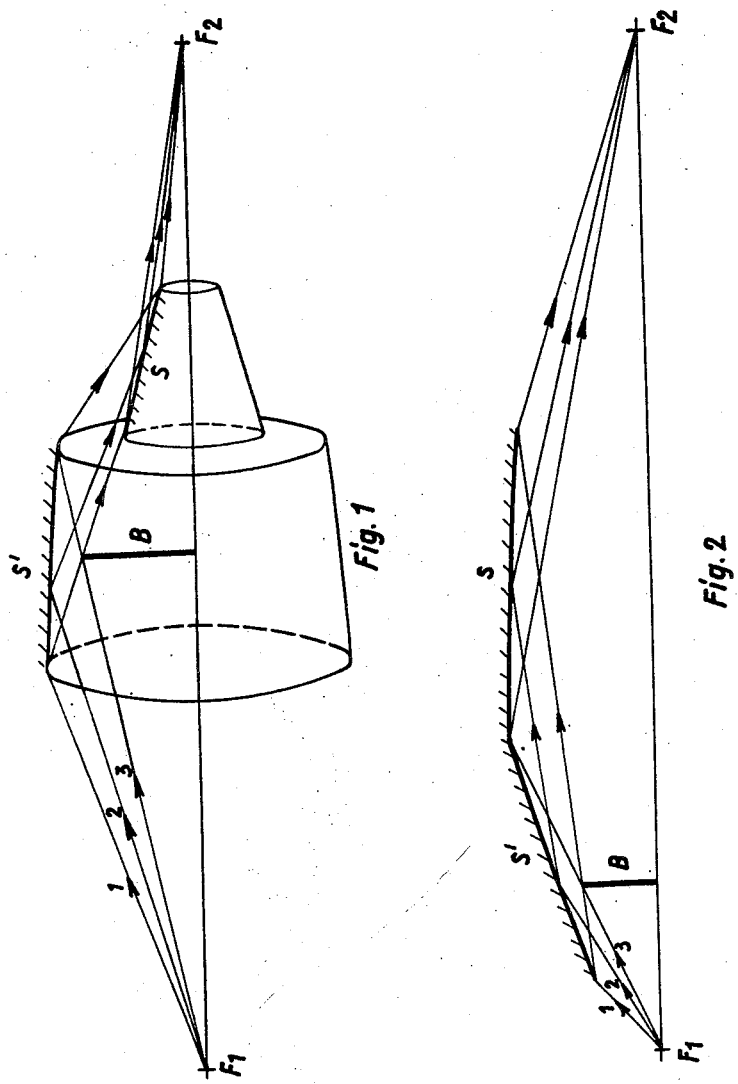

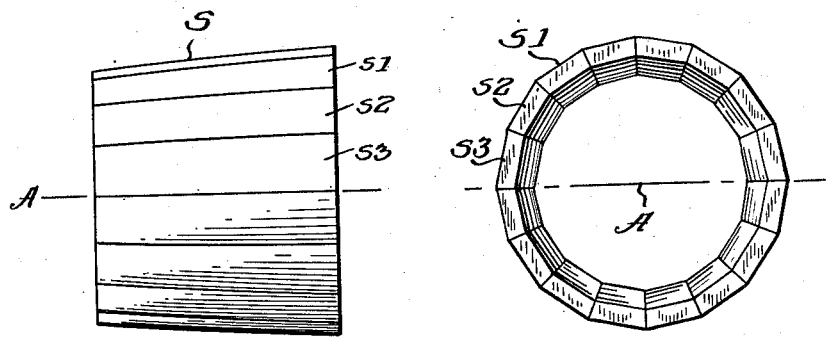

OPTICAL IMAGE-FORMING MIRROR SYSTEMS HAVING ASPHERICAL REFLECTING SURFACES

Günther Herrnring and Walter Weidner, Hamburg, Germany

Application May 20, 1952, Serial No. 288,910

Claims priority, application Germany May 25, 1951

12 Claims. (Cl. 250—53)

This invention is concerned with optical image-forming mirror systems comprising mirrors with aspherical reflection surfaces and having two focal points, the image of an object disposed at one of said focal points being formed at the other focal point by means of total reflection of extra-axial rays having small angles of incidence, and means in the path of centrally extending nonreflecting rays for making such rays ineffective. The invention is particularly applicable in X-ray microscopy.

Attempts have been made in the past to produce images optically by the use of X-rays. The expectation was that such images would show high resolution due to the short wave length employed and that they would reveal new information concerning the structure of matter. These attempts have so far failed to produce satisfactory results; they did not yield sufficient resolution and did not exhibit adequate freedom from optical defects. These prior endeavors employed for the formation of the images, among other expedients, the total reflection of X-rays upon circular cylindrical surfaces made of metal or glass. Bragg's reflections were likewise unsuccessfully tried.

It must be considered in this connection that only total reflection of rays is usable for the formation of the images, and that such reflection occurs only for rays incident upon reflecting surfaces at a very small angle, which is usually less than one degree. Rays that fall upon a surface at relatively great angles of incidence will penetrate into the reflecting surface and will not contribute to the formation of the image. The reflecting surfaces must therefore be disposed in the path of the rays so as to satisfy the incidence angle condition for total reflection.

The object of the invention is to produce a successful reflecting mirror system for the purpose stated, by constructing it of aspherical surfaces and employing such system to produce images only by the total reflection of extra-axial rays having small angles of incidence, while making centrally extending rays ineffective, for example, by the use of suitable shutter means for blocking such rays.

The use of the invention makes it possible to obtain, with finite object- and image-spacing, image-true magnification and also reduction. Strictly aplanatic achromatic images may be produced by the use of mirrors having surfaces which are determined by analytic functions. In the calculation of the forms of the mirrors, solutions may be gained, starting from the aplanatic properties, which permit the realization of the desired optical utility by the introduction of means for blocking out the central rays of the beam.

The invention is diagrammatically illustrated in the accompanying drawings, in which:

Fig. 1 shows an example of a new mirror objective in which the beam or ray path has the form of a bent or nicked polygon;

Fig. 2 illustrates an example lacking the bend or nick in the polygonal ray path;

Figure 3:
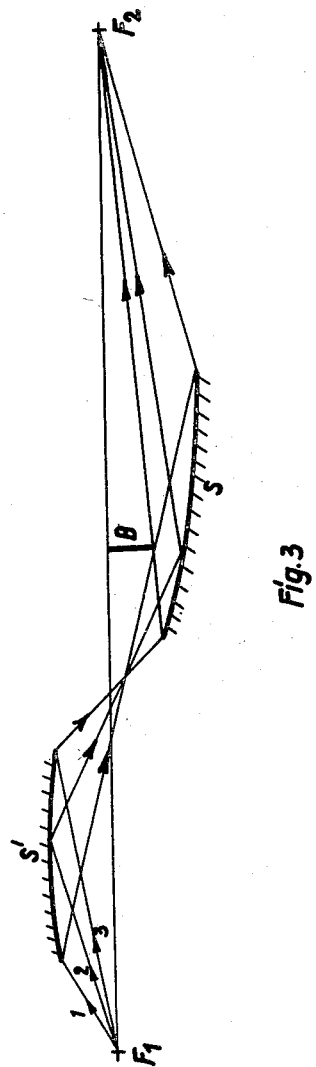

Fig. 3 indicates a further example in which the ray path crosses the axis of mirrors made according to the invention; and Figs. 4 and 5 show respectively a side elevational and an end view of the construction of a polygonal surface system.

Reference characters S and S' indicate sections of the mirror surfaces disposed relative to the plane of the respective drawings. $F_1$ and $F_2$ are focal points along the respective axes of the systems. At $F_1$ may be the object which is illuminated by X-rays or by light rays, or a body which radiates X-rays or light rays. An image of such object or body will in either case be formed at the focal point $F_2$. The mirror body S' in Fig. 1 is a generally barrel-shaped body, and reflection occurs on the inside thereof. The mirror body S is a similarly shaped body, and reflection takes place on the outside thereof. Similarly shaped mirror elements S' and S are employed in Figs. 2 and 3, but reflection occurs in these embodiments only on the inside of the reflecting elements. The barrel shape of the mirrors has been indicated in Fig. 1. The remaining figures show, for convenience only, curve sections of the corresponding mirror surfaces.

The curvature of the reflecting surfaces is, in accordance with the physical requirements, mathematically calculated, resulting in analytic functions which indicate point for point the curvature for aspherical achromatic image formation. The curvature of the mirror section S, S' along which the required reflection takes place, viewing the ray path as extending in a plane, is thus point for point calculated by the use of these functions. When the curvature of such a section S, S' is determined, the problem remains to produce, starting therefrom, a surface which will likewise produce the proper reflection.

This may be done by drawing the curve sections such as S and S' and using them as guiding lines along which straight elements or pieces of straight elements, which are disposed perpendicular to the drawing plane, are moved parallel to one another. The result will be a sector of a cylinder which extends perpendicular upon the drawing plane and which exhibits the curvature corresponding to S, S'. Depending on the length of the straight elements, such cylinder sector will be relatively narrow, and reflection would occur thereon with relatively low intensity. If a plurality of such cylinder sectors are arranged about the axis $F_1$—$F_2$, the result will be a polygonlike shape on the inside of which X-rays would be reflected with considerably greater intensity. The construction of such a polygonal surface system comprising individual aspherically curved longitudinal strips is apparent from Figs. 4 and 5. The individual strips are indicated at $s1$, $s2$, $s3$. The curvature is indicated at S. Reference character A indicates the optical axis. The arrangement of very many of such extremely narrow cylinder sectors or strips about the axis A will result in a surface which is produced by the rotation of the corresponding curve section S or S' about the system axis. It is also possible to form the reflecting surface by means of a template. The shaded curve sections S, S' indicated in the drawings thus represent the individual calculated curve lines. The corresponding interiorly and exteriorly reflecting surfaces are obtained by rotation of these individual curve lines about the axis $F_1$—$F_2$.

The curve sections are determined by maximal satisfaction of the sine condition, and the constancy of the sum of the partial light paths. The central rays are intercepted or blocked out by the shutter B. The ray path for one point of the axis is in each embodiment indicated by three rays 1, 2, 3. It will be seen that the ray path extends in Fig. 1 along the line of a polygon having a bent or nicked portion.

The embodiment shown in Fig. 2 differs from Fig. 1 by providing for a polygonal ray path which lacks the bend or nick, the reflection occurring on the inside of serially disposed barrel-shaped mirror elements.

The arrangement according to Fig. 3 comprises a mirror arrangement providing for a ray path which crosses the axis.

The novel reflecting systems, when used with X-rays, make it for the first time possible to produce useful, that is, coma- and aberration-free images, but they are not limited to such use, as they have the further advantage of being applicable in any frequency range. For example, it is possible to obtain in the range of visible light a high luminosity with technically more favorable position of the object and the image as compared with known concave mirror systems. In the range of infrared radiation as well as micro- and ultrashort waves can be obtained an improvement of the optical representation as compared with mirror forms which are determined by surfaces of the secondary order. The new systems are, on account of the good optical qualities, also applicable to neutrons and other particle radiation, insofar as they exhibit optical, and particularly total reflection. The systems may also be used for longitudinal waves as they occur, for example, in ultrasonic operation, for instance, for producing images of bodies by means of ultrasonic rays.

The mirror surfaces may be produced in different ways. Known mechanical machining, either by shaving or non-shaving methods, may be applied, which is useful for producing mirrors for microwaves and for long waves. Mirrors for purposes that put higher requirements on the surface finish may be obtained by known and suitable elastic forming of bodies having surfaces which approximate the desired forms, or by suitable controlled vaporization or sedimentation of suitable substances upon carriers having formed surfaces. The mirror surfaces may also be produced by galvanoplastic methods. Surfaces with minimal curvature, as they are particularly required for X-ray purposes, may be produced with the necessary accuracy, in the case of bi-crystals, by the piezoelectric effect or, in the case of ferromagnetic materials, by means of magnetostriction. In addition, thermal deformation of bimetals may be applied for giving the mirror surfaces the final form.

Details of the various methods to be employed for producing the mirrors as indicated above are known and have therefore not been illustrated, to avoid encumbering the drawings. Details of X-ray apparatus as such are likewise known and therefore have been omitted from the drawings.

Changes may be made within the scope and spirit of the appended claims.

We claim:

1. A reflecting mirror system for producing by means of X-rays strictly aplanatic achromatic images comprising bodies arranged to form about a common axis extending between two focal points closed exclusively aspherical reflecting mirror surfaces, and a ray-blocking element for intercepting rays projected between said focal points axially centrally of the system, whereby the image of an object disposed at one focal point is formed at the other focal point by extra-axial rays impinging upon said surfaces at small angles of incidence and being substantially totally reflected thereby.

2. The system defined in claim 1, comprising two reflecting surfaces respectively produced by rotation of the curvature-determining curve about said common axis, each of said surfaces forming a mirror for interior reflection.

3. The system defined in claim 1, comprising a plurality of more than two reflecting surfaces respectively produced by rotation of the curvature-determining curve about said common axis, each said surfaces forming an interiorly reflecting mirror.

4. The system defined in claim 1, comprising a plurality of more than two reflecting surfaces respectively produced by rotation of the curvature-determining curve about said common axis, at least one of said surfaces forming an interiorly reflecting mirror and at least one of said surfaces forming an exteriorly reflecting mirror.

5. The system defined in claim 1, wherein the form of said mirror surfaces is calculated according to analytic functions based on conditions conforming to strictly aplanatic achromatic image-forming, that is, on the maximal satisfaction of the sine condition and the constancy of the sum of the partial light paths.

6. The system defined in claim 1, wherein said reflecting surfaces are rotation surfaces produced by rotation of mathematically determined curve elements of the aspherical reflecting surfaces about the common axis.

7. The system defined in claim 1, wherein said reflecting surfaces are produced by elastic deformation of a base body having a surface shape which approximates the desired shape.

8. The system defined in claim 1, wherein said reflecting surfaces are produced by controlled vaporization of materials upon base bodies having surfaces approximating the desired shape.

9. The system defined in claim 1, wherein said surfaces are the surfaces of bi-crystal mirrors the final forms of which are produced by the piezoelectric effect.

10. The system defined in claim 1, wherein said mirror surfaces are formed by magnetostriction on bodies of ferromagnetic materials.

11. The system defined in claim 1, wherein said mirror surfaces are the surfaces of bi-metallic metals which are formed by deformation after heating thereof.

12. The system defined in claim 1, comprising two reflecting surfaces respectively produced by rotation of the curvature-determining curve about said common axis, one of said surfaces forming a mirror for interior reflection and the other forming a mirror for exterior reflection.

References Cited in the file of this patent
UNITED STATES PATENTS

| | | |
|---|---|---|
| 1,016,369 | Siedentopf | Feb. 6, 1912 |
| 1,865,441 | Mutscheller | July 5, 1932 |
| 1,892,893 | Karnes | Jan. 3, 1933 |
| 1,943,510 | Bauersfeld et al. | Jan. 16, 1934 |
| 2,077,740 | Caughlan | Apr. 20, 1937 |
| 2,534,543 | Bullock | Dec. 19, 1950 |
| 2,557,662 | Kirkpatrick | June 19, 1951 |
| 2,558,492 | Lely et al. | June 26, 1951 |
| 2,653,249 | Harker | Sept. 22, 1953 |

OTHER REFERENCES

Kirkpatrick et al.: "X-ray Optics" article in Journal of the Optical Society of America, pp. 772–774, vol. 38, No. 9, Sept. 1948, publ. by American Institute of Physics, New York City.